Aug. 5, 1952   R. N. MACDONELL   2,605,594
ABRASIVE HOLDING HAND TOOL
Filed Nov. 19, 1951
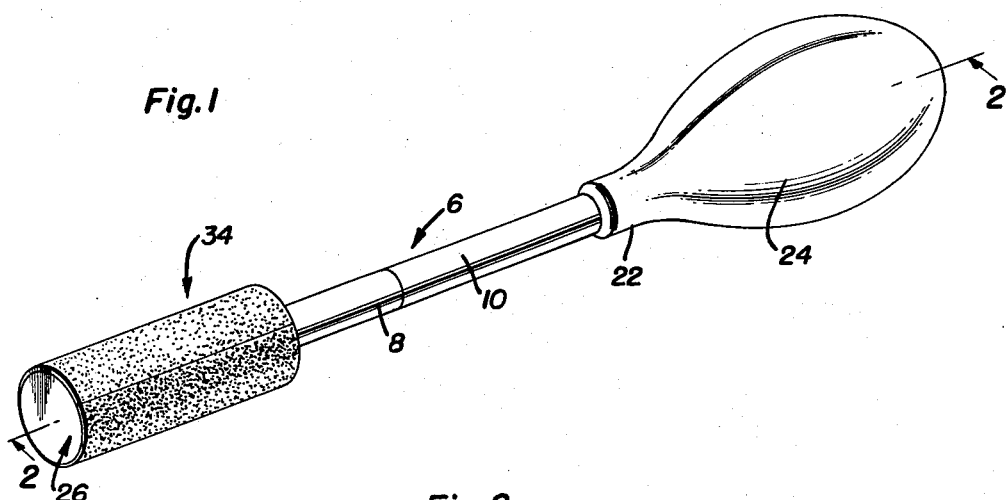
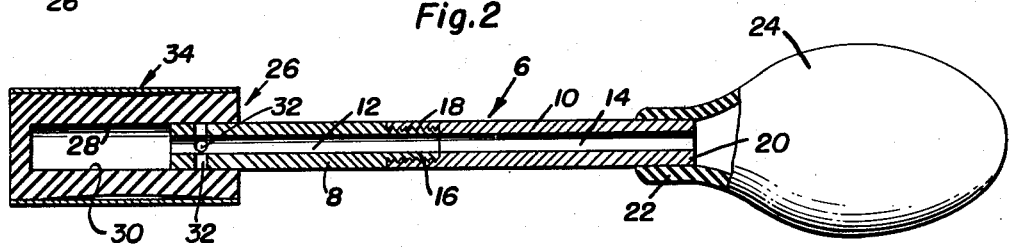
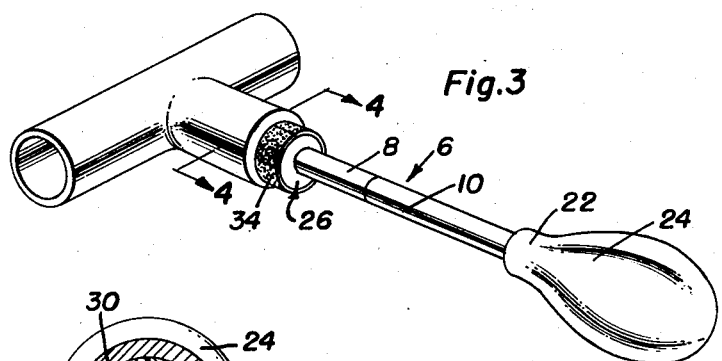
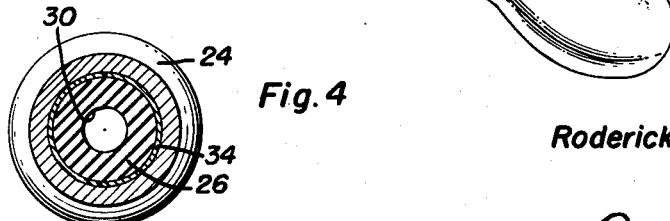
Roderick N. Macdonell
INVENTOR.
BY *Clarence A. O'Brien*
*and Harvey B. Jacobson*
Attorneys Patented Aug. 5, 1952

2,605,594

UNITED STATES PATENT OFFICE 2,605,594

ABRASIVE HOLDING HAND TOOL

Roderick N. Macdonell, North Miami, Fla.

Application November 19, 1951, Serial No. 257,070

3 Claims. (Cl. 51—192)

The present invention relates to certain new and useful improvements in hand tools and implements and has more particular reference to one which has facilities for properly accommodating a readily applicable and removable piece of abrasive paper in such a manner that the latter may be aptly and reliably employed in sanding and cleaning interior surfaces of copper and brass fittings to render the latter more effective for soldering purposes.

More specifically, the invention has to do with a tool having an expansible and contractible head or mandrel about which the piece of sandpaper is placed, handle means being provided whereby a sufficient amount of air may be pumped into the head to temporarily expand the same so that the desired oscillatory reaming motions may be aptly imparted.

In carrying out a preferred embodiment of the invention, a hollow shank is provided, the same being equipped on its outer end with an inflatable rubber head or mandrel which carries a piece of sandpaper, said shank being provided on its opposite end with a simple rubber bulb for forcing air through the bore of the shank into the mandrel.

Novelty, in addition, is predicated on the use of a mandrel which takes the form of a rubber cup into which an end of the hollow or tubular shank telescopes, the rubber bulb being fitted on the other end of the shank and the shank being made up of sections which are separably joined where one bulb equipped section serves to accommodate a plurality of complemental sections with mandrels of varying sizes to in this manner accommodate different work requirements.

Other objects and advantages will become more readily apparent from the following description and accompanying sheet of illustrative drawings.

In the accompanying sheet of drawings wherein like numerals are employed to designate like parts throughout the views:

Figure 1 is a perspective view of an abrasive holding hand tool constructed in accordance with the invention showing same in readiness for use.

Figure 2 is a view taken substantially on the plane of the longitudinal line 2—2 of Figure 1 looking in the direction of the arrows with a portion of the bulb appearing in elevation.

Figure 3 is a perspective view showing a T-shaped brass or copper fitting and showing the manner in which the abrasive element is inserted in one branch for use.

Figure 4 is an exaggerated cross section on the line 4—4 of Figure 3, looking in the direction of the arrows.

Referring now to the drawings and especially to Figure 2 wherein the parts are best shown a shank, sometimes called the handle portion, is denoted by the numeral 6. It is of hollow construction and is preferably made of complemental sections 8 and 10 having aligned bores 12 and 14 with the section 8 terminating in a reduced neck 16 screwed into a screw-threaded socket 18 provided therefor in the coacting end of the section 10. The other end portion 20 of the section 10 serves to accommodate the contracted attaching neck portion 22 of a rubber pressure bulb 24. The portions 10 and 24 form a unit and the portion 8 forms a unit in conjunction with the mandrel or head 26 which is carried thereby. It will be noticed that the head is of rubber and cylindrical in cross-section and has one end closed at 28 defining a socket 30. Actually, the head in cross-section is sort of an elongated cup and the adjacent end portion of the tubular shank 8 telescopes into the open end of the socket or cup where it is provided with radial air ports 32—32. It will be noticed that the central cross-section of the head is slightly reduced so that when the head is under expansion it will then assume uniform cross-sectional shape from end to end. The expansion, of course, serves to hold in place the readily applicable and removable sleeve 34 which encircles the head.

As before stated the expression "tool" is used advisedly because it is not merely a single instrumentality but rather tool means which is characterized by a plurality of complements. For example, the set of devices sold will include at least one unit made up of the shank section 10 carrying a suitable bulb 24. Then there will be any number of complemental interchangeable sections made up of the complements 8 and 26 so as to accommodate work requirements of varying conditions. So far as the factor of patentability is concerned the single representation in the drawings would seen to constitute an over-all satisfactory teaching of the invention.

Minor changes in shape, size, materials and rearrangement of parts may be resorted to in actual practive provided no departure is made from the invention as claimed.

Having decribed the invention, what is claimed as new is:

1. A tool of the class described comprising a longitudinally bored shank, a hand compressed inflation bulb on one end of said shank, and an expansible and contractible mandrel on the other end of the shank.

2. The structure specified in claim 1 wherein said mandrel is in the nature of a cup having an axial socket which is open at one end and closed at the opposite end, the corresponding end of said shank fitting into the open end of the socket.

3. A cleaning tool of the class described comprising an axially bored shank, a rubber hand compressed pumping bulb on one end of said shank, and abrasive holding expansible and contractible head means on the opposite end of the shank.

RODERICK N. MACDONELL.

REFERENCES CITED

The following references are of record in the file of this patent:

UNITED STATES PATENTS

| Number | Name | Date |
|---|---|---|
| 1,906,503 | Alderman | May 2, 1933 |
| 1,926,223 | Albera | Sept. 12, 1933 |
| 2,411,724 | Hill | Nov. 26, 1946 |